Figure 1:
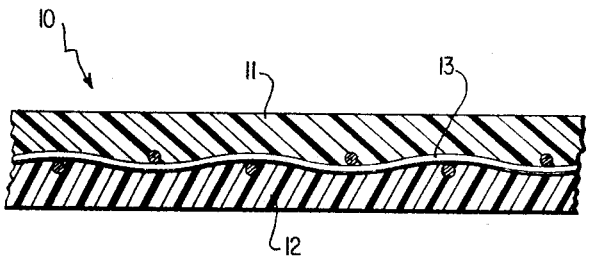

Oct. 18, 1966  S. HYMAN  3,279,986

BACTERIOSTATIC MATERIAL

Filed May 12, 1965

INVENTOR
SEYMOUR HYMAN

BY *Sughrue, Rothwell, Mion, Zinn & Macpeak*
ATTORNEYS 3,279,986
BACTERIOSTATIC MATERIAL
Seymour Hyman, Teaneck, N.J., assignor to Herculite Protective Fabrics Corporation
Filed May 12, 1965, Ser. No. 455,244
8 Claims. (Cl. 167—42)

The present invention relates to new bactericidal materials. Specifically, the present invention relates to bactericidal materials comprising flexible sheets of polyvinylchloride resin containing certain organotin compounds which not only impart bactericidal activity but also improve the thermal stability of the products.

Various fabrics and fibers having bactericidal and germicidal activity are well known and have been widely used in laboratories, hospitals and similar environments. The fabrics are fashioned into aprons, bed sheets, hamper liners, and related products. In order to reuse the materials, they must be subjected to repeated washings in hot water and sometimes to sterilization by steam or other high temperature sterilizing agents. Under such conditions, it has been found that synthetic resin sheets and fabrics incorporating various metallo-organo bactericidal agents deteriorate due to loss of thermal stability.

The object of the present invention is to provide improved bactericidal materials having superior stability when subjected to high temperatures.

In particular, the present invention comprises flexible sheets of polyvinylchloride containing from 0.10 to 0.62% by weight of a bacteriostatic organotin compound selected from the class of bis(tri-n-alkyltin) sulfosalicylates. Such compounds have the following generic formula:

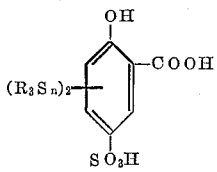

wherein R is a lower alkyl group containing from one to about 6 carbon atoms in the chain, and the alkyltin substituents are attached to the aromatic nucleus by replacement of the appropriate number of hydrogen atoms. A preferred compound is bis(tri-n-butyltin) sulfosalicylate (i.e., where $R = n\text{-}C_4H_9$).

Other ingredients are also incorporated in the polyvinylchloride composition to impart flexibility, color, strength and other properties desired in the end product. The other ingredients are generally known to those experienced in the art, and comprise one or more plasticizers, stabilizers, pigments and flame retarding agents. For example, in a typical formulation, polyvinylchloride is the major constituent and the following ingredients are added in the following percents by weight of the polymer: plasticizer, such as dioctylphthalate or diisooctyl phthalate, 60% to 90%; plasticizer, such as tricresyl phosphate or octyldiphenyl phosphate, 25% to 45%; pigment, such as phthalocyanine green, titanium dioxide or carbon black, 10% to 15%; flame retardant, such as antimony oxide, 2% to 3%; stabilizer, such as barium-cadmium laurate, 2% to 3%, and an amount of one or more of the bis(tri-n-alkyltin) sulfosalicylates as described above.

In particular, it has been found that the incorporation of from 0.10 to 0.62% of bis(tri-n-butyltin) sulfosalicylate into flexible polyvinylchloride sheeting results in products possessing improved thermal stability. Below about 0.10% bactericidal activity is not sufficient and above about 0.62% it is difficult to disperse the organotin compound in the polymer.

Furthermore, laminates of one or more plies of this unusual polyvinylchloride sheeting with various reinforcing or supporting materials, such as nylon or polypropylene fabrics, provide highly useful and durable products exhibiting excellent bacteriostatic activity in combination with improved heat stability.

This is quite unexpected and surprising, since it has been the experience in this field that the addition of germicidal and bactericidal agents to plastics and fabrics has generally resulted in a reduction of the thermal stability of the product.

The flexible polyvinylchloride sheet under present consideration may be produced in the following manner. The base resin, plasticizer, pigment, stabilizer, flame retarding agent and bacteriostat are mixed in the desired quantities, fed into a Banbury mixer, heated, conveyed into a mill and agitated until uniform. The blend is then conveyed to an extruder wherein it is extruded in tubular shape, and then fed between calender rolls and thus pressed into thin flat sheets.

In a preferred embodiment, plies of the flexible polyvinylchloride material are bonded to the surfaces of a ply of woven fabric to form a "sandwich" structure which has many desirable characteristics. Such materials find wide application as hospital sheeting, pillow covers, hospital laundry bags and for numerous other applications where sanitary conditions are necessary. The polyvinylchloride sheet possessing bacteriostatic properties can be laminated to appropriate reinforcing layers or fabrics by employing conventional equipment. While it is preferred to use woven fabrics as reinforcements, other sheets or layers of non-woven materials may also be used.

Figure 2:
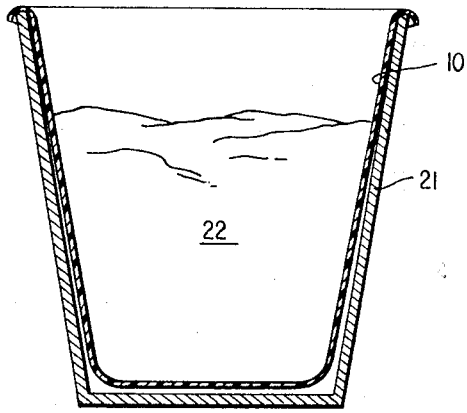

In the accompanying drawing, FIGURE 1 is a cross-sectional edge view of laminated sheet material in accordance with the present invention, and FIGURE 2 is a side cross-sectional view of the laminated sheet employed as a hamper liner.

Referring to FIGURE 1, a preferred embodiment of the present fabric 10 comprises two sheets of flexible polyvinylchloride, 11 and 12, both of which are impregnated with about 0.10 to 0.62% by weight, and preferably about 0.27 to 0.35%, of the organotin compound bis (tri-n-butyltin) sulfosalicylate (referred to as TBTSS). Only one of the two sheets need be impregnated with the bacteriostatic agent, however it is preferable that both be activated in this fashion. Sheets 11 and 12 are bonded to an intermediate porous woven fabric 13 such as nylon mesh. Of course useful products may also be formed by bonding only one sheet of flexible polyvinylchloride containing the bacteriostatic agent to only one surface of a reinforcing or supporting layer of woven nylon or other material.

As seen in FIGURE 2, a side cross-sectional view, fabric 10 may be used in the form of large, shaped sheets as liners for a hospital hamper 21 or the like. This liner may contain soiled linen 22 or other articles apt to be infected with various bacteria, germs and viruses.

To demonstrate the improved properties of the present material, sheets of plasticized polyvinylchloride were prepared as described earlier. In some instances the polymer contained no bacteriostatic agent and in other cases the bacteriostat is added to the polymer in various concentrations. A first group of laminates was produced by applying layers of the polyvinylchloride sheet, without the bactericidal agent, to opposite sides of an open nylon mesh. The thickness of the final product was controlled at various levels between about 5 and 20 mils. A second group was prepared in a similar fashion, this group being composed of polyvinylchloride sheets that contained the bactericidal agent.

Then the bactericidal properties of the above formulations were determined. The determination was made in several ways. One of the prime methods of analysis is known as the NYS–63 method. This procedure involves the inoculation of test specimens of the plastic material of standard size with a specific concentration of pre-cultured bacteria ($10^5$ organisms; *Staphylococcus aureus*) and observation of the degree of bacterial growth that occurs. Growth is observed in a standard AATCC bacteriostasis broth and the test bacterium are described in tentative test method 100–1961T of the 1962 AATCC Technical Manual Volume XXXVIII. Control experiments are performed concurrently, and the percent reduction in growth in the presence of the bacteriostat is observed after a period of time.

A second technique involves the "Wisconsin" method. This approach to determining antibacterial activity involves the initial incorporaton of a massive dose of bacteria into the system, and the observation of the percent reduction after a short incubation time (i.e., ½ hour). No control is employed here; the final count is compared solely to the initial count and a percent reduction is determined.

The results of a series of tests employing the NYS–63 method are outlined in Table I below.

eighty-fold after 24 hours. However, in the presence of the laminated vinyl-fabric-vinyl structure where the polyvinylchloride contains 0.37% bacteriostat, bactericidal growth is reduced by 99% of the observed count after the 24 hour interval. This is a remarkable reduction. At the 0.27% bacteriostat level, the percent reduction is less, but still very high.

As further evidence of the unusual bactericidal properties of this composition, Table II indicates the results of experiments performed on polymer combinations in the same fashion, except that the antibacterial activity was examined after considerably shorter intervals; ½ to 4 hours. The bacterial count is reduced by 98%–99% after these intervals. It is seen that efficient antibacterial activity occurs essentially immediately after testing is initiated. The high efficiency of this antibacterial material is clear.

*Table II*

[Bactericidal Properties of TBTSS; 30 minutes to 4 Hours Incubation Period/NYS–63 Method]

| Specimen | Thickness (mil) | Bacteriocide | Concentration (percent) | Incubation Time (hours) | Final Bacterial Count ($\times 10^6$) | Percent Reduction Over Control |
|---|---|---|---|---|---|---|
| Vinyl Sheet | 8 | None | | ½ | 2.1 | |
| Do | 8 | None | | 1 | 4.3 | |
| Do | 8 | None | | 4 | 5.0 | |
| Laminated Fabric | 15 | TBTSS | 0.39 | ½ | .04 | 98 |
| Do | 15 | TBTSS | 0.39 | 1 | .05 | 99 |
| Do | 15 | TBTSS | 0.39 | 4 | .12 | 98 |

Initial Bacterial Count=$10^5$.

The results of the Wisconsin method referred to earlier are indicated in Table III. It is seen that 94% reduction occurs in 30 minutes when this test is employed. In this table, results for both the face and reverse side of the laminate are presented; it is seen that they are similar and essentially identical, within experimental error. It is to be noted that similar, essentially identical results for

*Table I*

[Bactericidal Properties of TBTSS; 24 Hour Incubation Period/NYS–63 Method]

| Specimen | Thickness (mil) | Bacteriocide | Concentration (percent) | Percent Reduction over Control |
|---|---|---|---|---|
| Control | 8 | None | | |
| Vinyl Sheet | 7 | TBTSS | 0.37 | 99 |
| Do | 7 | TBTSS | 0.68 | 99 |
| Do | 7 | TBTSS | 1.03 | 99 |
| Laminated Fabric | 11 | None | | None |
| Do | 11 | TBTSS | 0.35 | 98 |
| Do | 15 | TBTSS | 0.35 | 98 |
| Do | 11 | TBTSS | 0.30 | 98 |
| Do | 11 | TBTSS | 0.27 | 77 |
| Do | 15 | TBTSS | 0.27 | 86 |

Initial bacterial count=$10^5$; counter after 24 hours=$8 \times 10^6$ for control
Control=flexible vinyl sheet without the bacteriocide.

It is seen that when bacteriostat is absent, bacterial growth is efficient and profuse; the bacteria multiply by the face and reverse sides of the fabric laminate were also noted with the NYS–61 test method.

*Table III*

Bactericidal Properties of TBTSS; Wisconsin Method Initial Inoculation $73 \times 10^5$ Organisms

| Specimen | Side | Time | Count | Percent Reduction |
|---|---|---|---|---|
| Laminated Fabric | Face | 30 minutes | $4.5 \times 10^6$ | 94 |
| | Reverse | | $3.9 \times 10^6$ | 95 |

As an example of the improved heat stability that results from these compositions, various specimens that were heated in a forced draft oven are shown in Table IV. The color that develops upon heating of polyvinylchloride systems is a common, well-known problem. It is seen that color formation is decreased and minimized in these speci-containing TBTSS that have been heated under the same conditions as those that do not contain the antibacterial agent.

*Table IV*

Heat Stability of PVC Formulations With and Without TBTSS

| Specimen | Original Thickness (mil) | TBTSS Conc. (percent) | Color after Heating at 160° C./4 Hours | Color of Unheated Specimen |
|---|---|---|---|---|
| Vinyl Fabric | 11 | 0 | Pink-light purple | Pure White. |
| Do | 11 | 0.27 | Lt. Pink-lt. yellow | Do. |
| Vinyl Film | 2.5 | 0 | Pink | Do. |
| Do | 2.5 | 0.35 | Light yellow | Do. |

The above data demonstrates that the addition of small amounts of bis(tri-n-alkyltin) sulfosalicylate to polyvinylchloride sheets not only does not accelerate thermal degradation of the product, but unexpectedly improves resistance of the material to thermal deterioration.

It will be obvious to those skilled in the art that various modifications may be made in the material described above without departing from the scope or spirit of the present invention as expressed in the following claims.

What is claimed is:

1. A bactericidal material having improved thermal stability comprising a flexible sheet of polyvinylchloride having dispersed throughout it, from 0.10 to 0.62% by weight of bis(tri-n-alkyltin) sulfosalicylate wherein said alkyl group has from 1 to about 6 carbon atoms.

2. The bactericidal material of claim 1 wherein the bis(tri-n-alkyltin) sulfosalicylate is bis(tri-n-butyltin) sulfosalicylate.

3. A bactericidal material having improved stability comprising a flexible sheet of polyvinylchloride bonded to a reinforcing fabric, said sheet having dispersed throughout it from 0.10 to 0.62% by weight of bis(tri-n-alkyltin) sulfosalicylate wherein said alkyl group has from 1 to about 6 carbon atoms.

4. A bactericidal material as defined in claim 3 wherein said organotin compound is bis(tri-n-butyltin) sulfosalicylate.

5. A bactericidal material as defined in claim 3 wherein said reinforcing fabric is a woven nylon fabric.

6. A bactericidal material having improved thermal stability comprising two sheets of flexible polyvinylchloride, one of said sheets being bonded to a first surface of a layer of reinforcing fabric and the second of said sheets being bonded to the other surface of said fabric, at least one of said sheets having dispersed in it from 0.10 to 0.62% by weight of bis(tri-n-alkyltin) sulfosalicylate wherein said alkyl group has from 1 to about 6 carbon atoms.

7. A bactericidal material as defined in claim 6 wherein said organotin compound is bis(tri-n-butyltin) sulfosalicylate.

8. A bactericidal material as defined in claim 6 wherein said reinforcing fabric is a woven nylon fabric.

References Cited by the Examiner

UNITED STATES PATENTS 2,567,910   9/1951   Malone _____ 167—42
3,075,863   1/1963   Frey _____ 167—88

OTHER REFERENCES

Leebrick: J. Chem. Abstracts, volume 60, (1964), page 3008C.

JULIAN S. LEVITT, *Primary Examiner.*

STANLEY J. FRIEDMAN, *Assistant Examiner.*